F. ECKERT.
CAKE TURNER.
APPLICATION FILED JULY 14, 1915.
1,214,522.
Patented Feb. 6, 1917.
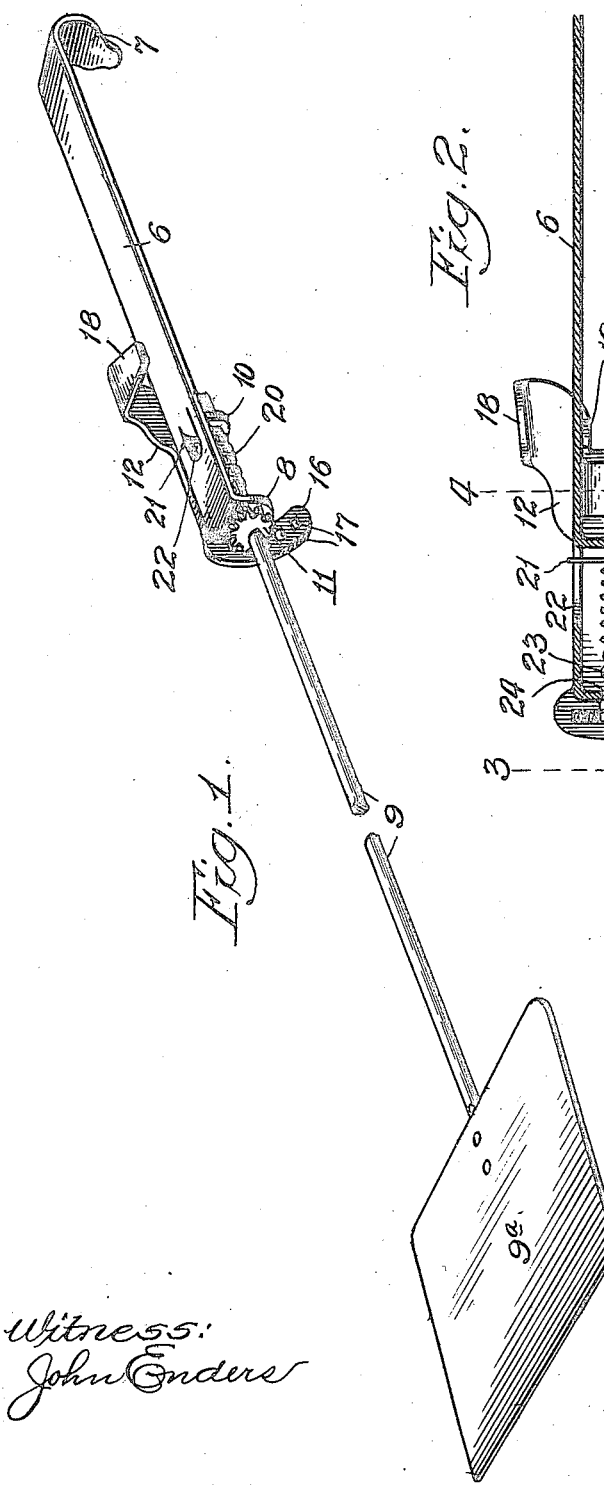
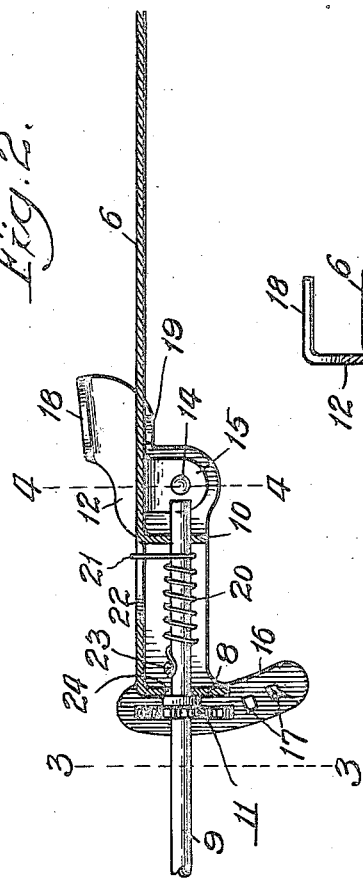
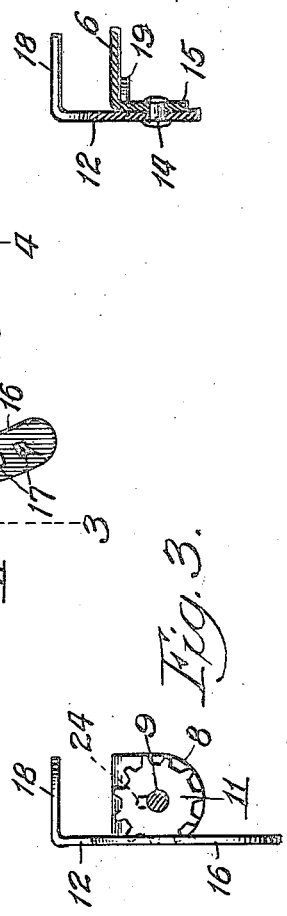
Witness:
John Enders
Inventor:
Frank Eckert
by Fred Gerlach
his Atty.

UNITED STATES PATENT OFFICE.

FRANK ECKERT, OF CHICAGO, ILLINOIS.

CAKE-TURNER.

1,214,522.  Specification of Letters Patent.  Patented Feb. 6, 1917.

Application filed July 14, 1915. Serial No. 39,752.

*To all whom it may concern:*

Be it known that I, FRANK ECKERT, a resident of Chicago, in the county of Cook and State of Illinois, have invented certain new and useful Improvements in Cake-Turners, of which the following is a full, clear, and exact description.

The invention relates to cake turners.

One object of the invention is to provide an improved cake-turner which is simple in construction and can be produced at a low cost.

A further object of the invention is to provide an improved cake turner which can be formed of stampings so that it will be light in weight for easy manipulation.

The invention consists in the several novel features hereinafter set forth and more particularly defined by claims at the conclusion hereof.

In the drawings: Figure 1 is a perspective of a cake turner embodying the invention. Fig. 2 is a longitudinal section. Fig. 3 is a section taken on line 3—3 of Fig. 2. Fig. 4 is a section taken on line 4—4 of Fig. 2.

The device comprises a handle 6 which is formed of a flat strip of metal. The handle has a hook 7 at one end to prevent the handle from slipping out of the operator's hand, and which may also serve as a hook whereby the device may be suspended when not in use, and a down-turned tongue 8 at its other end which provides a bearing for a spindle 9. The handle also has a tongue or lug 10 which is struck up from the strip to form a second bearing for the spindle. A holder plate 9ᵃ of any suitable form and which is slipped under the cake is riveted to the free end of the spindle 9. A pinion 11 is rigidly secured to the spindle and is disposed adjacent the tongue 8. A finger-lever 12 is pivoted, as at 14, to a down-turned tongue 15 at one side of the handle 6. This finger-lever is formed of sheet metal and with a portion 16 having an arcuate series of holes 17 therein adapted to receive the teeth of pinion 11. By employing holes in the lever for the pinion, the spindle will be held against displacement from the handle by the lever. Lever 12 is bent angularly, as at 18, to form a finger-piece for the thumb of the operator, which is disposed to overlie the handle 6 so that it will serve as a stop for limiting the pivotal movement of the lever in one direction. The lever is also provided with a laterally disposed tongue 19 extended to underlie the handle 6 and form a stop for limiting the pivotal movement of the lever in the reverse direction. These stops are disposed to limit the movement of the lever so that the plate 9ᵃ will be rotated relatively to the handle through the desired arc to effect inversion of the cake or article to be handled by the device, and usually this movement extends through an arc somewhat in excess of 90°. The stroke of the lever is comparatively short and limited so that when it is operated by the pressure of the thumb, the plate will be rotated quickly and brought to a sudden stop before the cake has been entirely turned, the momentum of the cake sufficing to effect the completion of the turning thereof. A spring 20 is coiled around spindle 9 between bearing tongues 8 and 10 and one end of this spring is extended, as at 21, into the slot 22 left in the handle by striking up the tongue 10. The other end of the spring is hooked around a pin 23 fixed in and projecting from the spindle 9. A slot 24 is formed in the tongue 8 and communicates with the bearing therein to permit the pin 23 to be passed through the tongue 8 in assembling the device. This spring serves also to hold the lever, spindle and holder-plate in normal position relatively to the handle 6.

In assembling the device, the spindle with the pin 23 thereon is slipped through the bearing in tongue 8 and through the spring which will be held between the tongues 10 and 8. Next, the lever will be placed into engagement with the pinion and connected to the handle by rivet 14 and all of these parts will then be held in connected relation. The ends of the spring 20 may be sprung around the pin 23 after the spindle has been placed in operative position in the tongues 8 and 10.

The invention thus exemplifies an improved cake turner which is exceedingly simple in construction and which can be produced at a low cost. The handle and lever are of such construction that stampings can be utilized. As a result of employing a lever with holes 17 therein, into which the teeth of the pinion pass, the spindle will be held against longitudinal movement in its bearings by the lever, so that special means for holding the spindle against longitudinal movement are unnecessary. This facilitates the assembling of the device.

The invention is not to be understood as restricted to the details set forth, since these may be modified within the scope of the appended claims without departing from the spirit and scope of the invention.

Having thus described my invention, what I claim as new, and desire to secure by Letters Patent, is:—

1. In a device of the character described, the combination of a handle formed of a flat strip of metal, having an end portion bent angularly to form a bearing tongue, a struck-up portion bent to form another bearing tongue, and a downturned pivot lug, a spindle extending through and rotatable in said tongues, a holder secured to the spindle, a lever pivoted to said lug, and means between the spindle and the lever for imparting a partial rotation to the spindle and holder.

2. In a device of the character described, the combination of a handle formed of a flat strip of metal, having portions thereof bent angularly to form a plurality of bearing tongues, a spindle extending through and rotatable in said tongues, a lever pivoted at one side of the handle and provided with a rack, a pinion fixed to the spindle engaging the rack and disposed forwardly of the lugs, and a coil spring on the spindle and between said lugs.

3. The combination of a handle provided with a tongue at one side thereof, a spindle rotatably mounted on the handle, a holder secured to the spindle, a lever pivoted at said tongue to swing vertically, formed of a strip of metal and with integrally inturned stop-tongues above and below the handle respectively, and a gear between the spindle and the lever for imparting a partial revolution to the spindle.

4. The combination of a handle having a bearing thereon, a spindle rotatably mounted in said bearing, a holder secured to the spindle, a lever pivoted to the handle and having an arcuate series of openings therein and a pinion fixed to the spindle having teeth extending into said openings and whereby the lever will serve to hold the pinion and spindle against longitudinal movement, said pinion being disposed in front of the inner end of the handle.

5. The combination of a handle having bearing tongues formed thereon, one of said tongues being struck up from the central portion of the handle so as to leave a slot therein, a spindle mounted in the bearings, a holder secured to the spindle, a lever pivoted to the handle, means between the spindle and the lever for rotating the spindle and a spring on the spindle having one of its ends extended into said slot.

6. The combination of a handle formed of a strip of metal having portions bent angularly to form bearing tongues and a tongue at one side thereof, a spindle mounted in said bearing tongues, a holder secured to the spindle, a lever pivoted to said side tongue, formed of a strip of metal, having portions thereof bent laterally to underlie and overlie the handle respectively, a pinion secured to the spindle, the lever having holes therein for the teeth of the pinion, and a spring coiled around the spindle for retracting the lever and disposed between the bearing tongues.

FRANK ECKERT.

Witnesses:
 MILDRED STUMPF,
 KATHARINE GERLACH.